(12) United States Patent
Huber et al.

(10) Patent No.: US 6,425,467 B2
(45) Date of Patent: Jul. 30, 2002

(54) ACTUATION ARRANGEMENT FOR MOVABLE COMPONENTS ON VEHICLES

(75) Inventors: Gerhard Huber, Frankenhofen; Klaus Schweiger, Steingaden, both of (DE)

(73) Assignee: Hoerbiger Hydraulik GmbH, Schongau (DE)

( * ) Notice: Subject to any disclaimer, the term of this patent is extended or adjusted under 35 U.S.C. 154(b) by 5 days.

(21) Appl. No.: 09/797,178

(22) Filed: Mar. 2, 2001

(30) Foreign Application Priority Data

Mar. 23, 2000 (AT) ............................................ 503/2000

(51) Int. Cl.$^7$ .................................................. F16F 9/00
(52) U.S. Cl. .................. 188/321.11; 267/220; 267/113; 188/322.14; 188/286; 188/304; 188/322.21
(58) Field of Search ....................... 188/322.14, 322.19, 188/322.2, 315, 286, 304, 321.11, 266, 297, 305, 308, 322.21; 267/64.11, 150, 220, 113

(56) References Cited

U.S. PATENT DOCUMENTS 5,375,507 A  * 12/1994 Kladiwa et al. .............. 29/507
5,839,552 A  * 11/1998 Vandewal et al. ..... 188/321.11

* cited by examiner

*Primary Examiner*—Jack Lavinder
*Assistant Examiner*—Melanie Torres
(74) *Attorney, Agent, or Firm*—Dykema Gossett PLLC

(57) ABSTRACT

An actuation arrangement for movable components on vehicles, particularly for trunk lids or hoods, doors, vehicle tops and top covers, including at least one hydraulic cylinder (1) pivotably coupled to a cylindrical pivot pin (11) on the vehicle and/or on the movable vehicle component, and having at least one line (1) for the pressure medium in at least one working chamber (6, 9) of the hydraulic cylinder. To allow pivoting of the hydraulic cylinder principally at any angle with low space requirements and a low risk of damage to the hydraulic lines, one section (16) of each pressure medium line passes through the pivot pin (11) essentially in an axial direction and at least one passage leads from the pivot pin (11) to at least one working chamber (6, 9) of the hydraulic cylinder (1)

18 Claims, 6 Drawing Sheets

ACTUATION ARRANGEMENT FOR MOVABLE COMPONENTS ON VEHICLES

BACKGROUND OF THE INVENTION

1. Field of the Invention

The invention relates to an actuation arrangement for movable components on vehicles, particularly for trunk lids or hoods, doors, vehicle tops and top covers, which include at least one hydraulic cylinder pivotably coupled to a cylindrical pivot pin on the vehicle and/or on the movable vehicle component, and having at least one line for the pressure medium in at least one working chamber of the hydraulic cylinder.

2. The Prior Art

Hydraulic cylinders, particularly for the use in motor vehicles, have a connection for the pressure medium on the rod side and/or the bottom side onto which the supply lines (mostly hoses) with pressure medium are attached. The hydraulic cylinder itself is also moved at the time of movement of the vehicle component actuated by the hydraulic cylinder. The danger exists thereby, in a way, that hoses may be kinked, which might lead to an interruption of the (pressure medium) supply to the hydraulic cylinder and might cause damage to the hoses themselves. This danger could be eliminated by wide loops, but this is in contradiction to the demands for the least possible space requirements. The hoses are often times placed on the outside and they are exposed thereby to risk of damage.

The object of the present invention was therefore to provide an arrangement that allows pivoting of the hydraulic cylinder principally at any angle with low space requirements and a low risk of damage to the pressure medium lines.

SUMMARY OF THE INVENTION

This object is achieved according to the invention whereby one section of each pressure medium line passes through the pivot pin essentially in an axial direction and whereby at least one passage leads from the pivot pin to at least one working chamber of the hydraulic cylinder. With this rotating passage of the pressure medium line leading through the pivot pin and through the pivot point of the working cylinder, the cylinder—which may be pivoted in any direction—may be supplied with pressure medium so that the line sections do not have to be moved together with the cylinder or they cannot be kinked, and the movement of the hydraulic cylinder is not restricted. The line sections leading up to the pivot pin may be mounted essentially in a fixed and protected manner within the body of the vehicle, for example, so that the risk of damage from pivoting or from exterior influences is minimized.

According to a first embodiment, one section of the hydraulic cylinder encompasses at least partially the rigidly attached pivot pin whereby the section of at least one line leading axially through the pivot pin merges into at least one essentially radial conduit, which in turn runs into at least one groove that reaches around at least one part of the circumference of the pivot pin. A simple but very flexible construction is thereby provided since many different hydraulic cylinders may be arranged to cooperate with one pivot pin and whereby the cylinder may be used interchangeably.

The entire arrangement becomes especially simple in a version in which at least one pressure medium line enters axially into the pivot pin.

Advantageously, at least one axial connection for a pressure-medium supply line is provided in the pivot pin.

According to a second advantageous embodiment of the invention, the pivot pin is rigidly (non-rotatably) connected to the hydraulic cylinder and the section of at least one line leading axially through the pivot pin merges at the opposite side of the hydraulic cylinder into at least one essentially radial conduit, which in turn runs into a groove that encompasses at least a part of the circumference of the pivot pin, whereby the side of the pivot pin that is provided with at least one groove may be connected to a pressure-medium connection sleeve. The section that is mechanically stressed the most is here especially solid, namely the transition section between the pivot pin and the holding structure on the vehicle, and the section is protected from pressure medium losses in this area. The transition piece allowing the transfer of the pressure medium from the rigidly arranged lines into the pivot pin, which is pivotable relative to the lines, occurs in the protected area at the side of the holding structure and opposite the hydraulic cylinder.

The transfer of the pressure medium from the fixed pivot pin to the hydraulic cylinder is accomplished in that at least one groove reaches around the entire circumference of the pivot pin. The best possible pivoting capability of the hydraulic cylinder is thereby achieved since a transfer possibility of the pressure medium going from the pivot pin into the hydraulic cylinder exists at any arbitrary angle. Of course, grooves along smaller circumferential sections of the pivot pin are possible for smaller necessary pivoting angles.

According to a first embodiment, at least one groove alone may be formed in the pivot pin whereby the pivot pin may receive the groove at its outer surface without suffering mechanical weaknesses because of the size of the pin and whereby the surface is easily accessible for machining.

An additional embodiment may be advantageous for larger cross sections whereby at least one groove is formed by opposed recesses in the pivot pin as well as in the section of the hydraulic cylinder that encompasses the pivot pin.

According to an additional embodiment of the invention, at least one groove alone may be formed, of course, in the section of the hydraulic cylinder encompassing the pivot pin, which provides a mechanically stronger and more stable construction for relative thin pivot pins and stronger end-sections of the hydraulic cylinder.

To make possible a particular movement and angular position of the cylinder axis of the hydraulic cylinder, according to an additional characteristic of the invention the pivot pin is mounted and held in a holding structure which may be moved about at least an axis that is oriented at an angle to the axis of the pivot pin.

In a structurally simple manner, an elastomer bearing may be inserted between the pivot pin and the holding structure.

However, a steady guiding movement is achieved during the angled movement of the cylinder axis, according to the invention, if the part of the pivot pin received in the holding structure is provided with an at least partially spherical surface and whereby the receiving area of the holding structure is formed in a complimentary manner thereto.

According to an additional characteristic of the invention, the pivot pin is mounted in a bearing casing having an at least partly spherical surface and the receiving area of the holding structure is formed complimentary to the surface of the (bearing) casing. With this construction, it can be guaranteed—especially with the mechanically strong design of the pivot pin being firmly attached to the hydraulic cylinder—that movements and angular positions of the hydraulic cylinder axis are possible to be around an axis that is oriented at an angle to the axis of the pivot pin.

The actuation arrangement for vehicles are typically equipped with a double-action hydraulic cylinder, which effects the movement of the moving vehicle component in both directions. For arrangements of this type, according to the invention, at least two hydraulic lines pass through the pivot pin essentially in an axial direction and which merge into at least one essentially radial conduit, which in turn runs into at least one groove per line that encompasses at least partially the circumference of the pivot pin.

According to an additional characteristic of the invention, to save more space and to reduce the risk of damage to the hydraulic lines as much as possible, the passage to the working chamber of the hydraulic cylinder, which faces away from the pivot pin, leads through the inside of the hydraulic cylinder.

This is advantageously achieved, according to the invention, in that the hydraulic cylinder is designed as a double-barrel cylinder whereby the passage to the working chamber of the hydraulic cylinder, which faces away from the pivot pin, is formed by the annular space between the two barrels of the hydraulic cylinder.

In the above-mentioned embodiment at least one additional component, preferably a pneumatic spring, may be attached parallel to one or each hydraulic cylinder whereby one end of the pneumatic spring is connected to the section of the hydraulic cylinder that encompasses the pivot pin, and whereby the other end is coupled to the piston rod of the hydraulic cylinder. Thereby, the components that already act in combination upon the moving vehicle component may advantageously be used together and constructional interferences in the construction of vehicles may remain as low as possible.

In the following description, the invention is explained in more detail with the aid of particular embodiment examples and accompanying drawings.

DETAILED DESCRIPTION OF THE PREFERRED EMBODIMENTS

Figure 1:
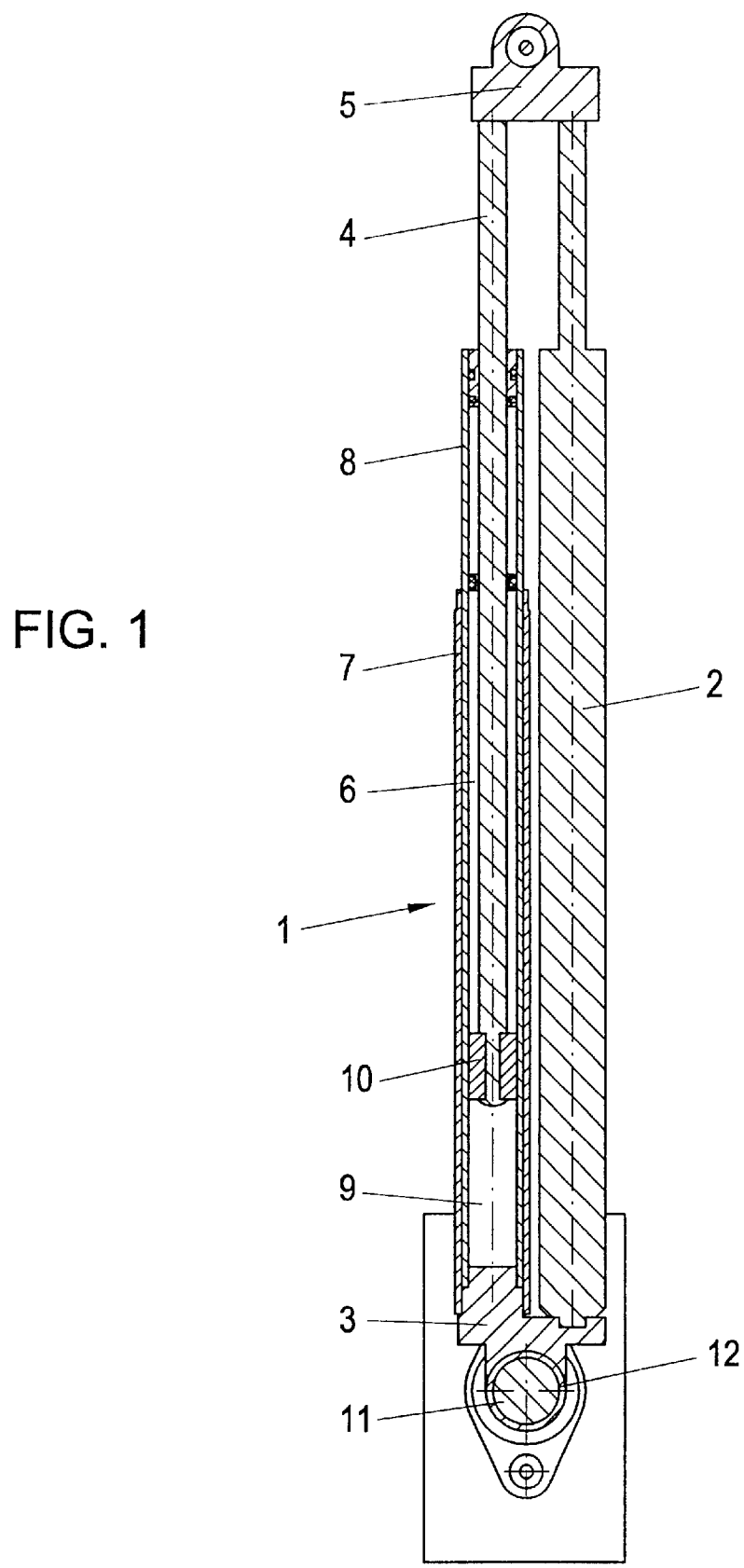
FIG. 1 shows a longitudinal sectional view through an arrangement according to the invention, consisting of a double-action hydraulic cylinder and a pneumatic spring.

The actuation arrangement illustrated in FIG. 1 for movable components on vehicles, particularly for trunk lids or hoods, doors, vehicle tops and top covers, includes a double-action hydraulic working cylinder 1, which is coupled to an additional vehicle component in the exemplary embodiment, in this case a pneumatic spring 2, whose details are not closer illustrated since it is not part of the invention. The communication between the two components 1, 2 is advantageously achieved in that one end of the pneumatic spring is connected to the bottom 3 of the working cylinder 1, and the other end is coupled to the piston rod 4, preferably via a yoke 5, which also allows fastening of the arrangement to the vehicle components that are to be moved.

To minimize space requirements for the arrangement 1,2 in addition to minimizing risk of damage, the working cylinder 1 is designed as a double-barrel cylinder wherein the passage to the working chamber 6 of the working cylinder 1 is opposite the bottom 3 whereby the passage is formed by the annular space between the two barrels 7, 8 and the cylinder 1. The opposed working chamber, which is separated from the first working chamber by the piston 10 of the working cylinder 1 and which is directly connected to the bottom 3, is advantageously supplied directly through a passage on the bottom 3 with the pressure medium (here with hydraulic oil).

The working cylinder 1 and also the pneumatic spring 2, which is attached with one of its ends to the bottom 3, are pivotably coupled to a cylindrical pivot pin 11 on the vehicle, or they are alternatively coupled possibly to the movable vehicle component. As it is explained in more detail in the following, the lines for the pressure medium run into the working chambers 6, 9 of the working cylinder 1 through the pivot pin 11 that serves as its pivotable attachment, and the lines continue to run through the bottom 3 of the working cylinder 1, thusly, externally running lines and lines susceptible to being kinked or damaged may be avoided. The bottom 3 of the working cylinder 1 includes additionally a section 11 that encompasses the pivot pin 11 and which is essentially formed in an annular manner.

Figure 3:
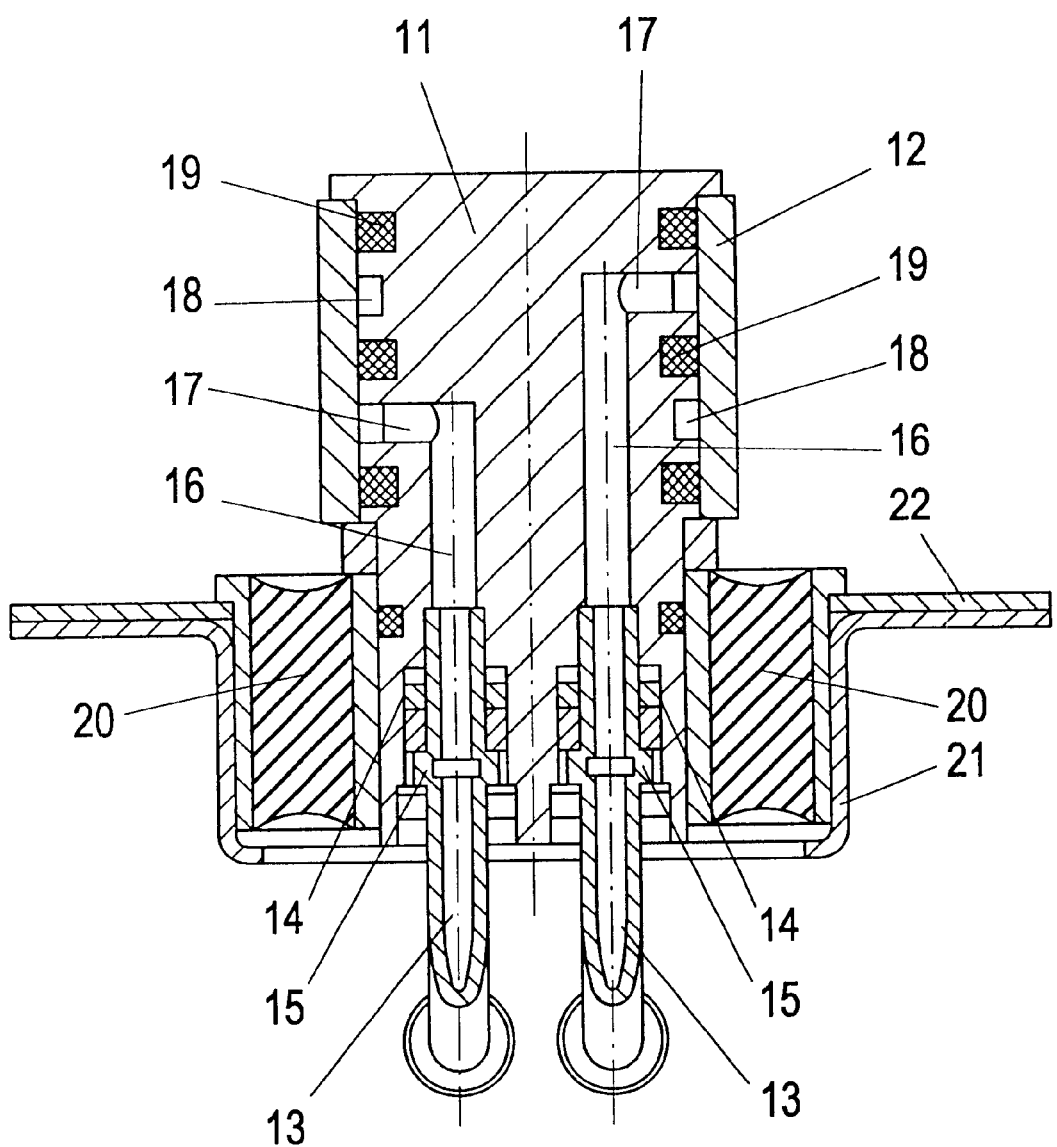
FIG. 3 shows a longitudinal sectional view of a plane turned 90° relative to FIG. 2.

The pivoting passage leading through the pivot pin 11 and the section 12 of the bottom 3 is supplied with pressure medium through pressure medium lines 13 running preferably axially into the pivot pin 11. As can be seen in FIG. 3, two axially oriented connection recesses 14 are provided therein for the plug-in connections 15 of the pressure-medium supply line 13. Starting from the connection recesses 14, there is provided for each pressure medium line at least one section 16 for the pressure medium whereby said section 16 leads through the pivot pin 11 essentially axial and merges subsequently into at least one essentially radial conduit 17. On at least one location, the conduit 17 runs into at least one groove 18 that encompasses at least partially the circumference of the pivot pin 11. The larger the angle range is which covers the groove 18, the greater is also the pivoting range of the working cylinder 1, over which pivoting range said working cylinder 1 may be supplied with the pressure medium. The groove 18 preferably covers the entire circumference of the pivot pin 11, which means, it allows the pivoting of the working cylinder 1 around 360°. Starting from the groove 18, the pressure medium enters into the section 12 of the working cylinder 1 that encompasses the pivot pin 11, and it continues to run subsequently through at least one of each passage to the working chambers 6, 9 of the cylinders 1. Between the individual grooves 18 and outside of each outermost groove 18, there are seals 19 provided that allow twisting or they cooperate with the turning or they can withstand relative twisting. The seals 19 are preferably also provided in corresponding grooves in the pivot pin 11, or in the section of the working cylinder 1 that encompasses the pivot pin 11, or both parts.

Depending on the available dimensions of the pivot pin 11 or the section 12 of the bottom 13 of the working cylinder 1, with light machining one or at least one of the grooves 18 may be formed in the pivot pin 11 since the surface areas of the pivot pin 11 is easily accessible for machining. In contrast, large cross sections in grooves 18 may be obtained if at least one groove is formed by opposed recesses in the pivot pin 11 as well as in the section 12 that encompasses the pivot pin 11, according to an alternative embodiment (not illustrated in the drawings). Should the pivot pin 11 have to be kept very thin whereby, for example, the machining of a groove could lead to a mechanical weakness (also not shown in the drawings), then it may be suggested that at least one groove alone is machined in the section 12 of the working cylinder 1 that encompasses the pivot pin 11 to allow pivotable coupling.

Figure 2:
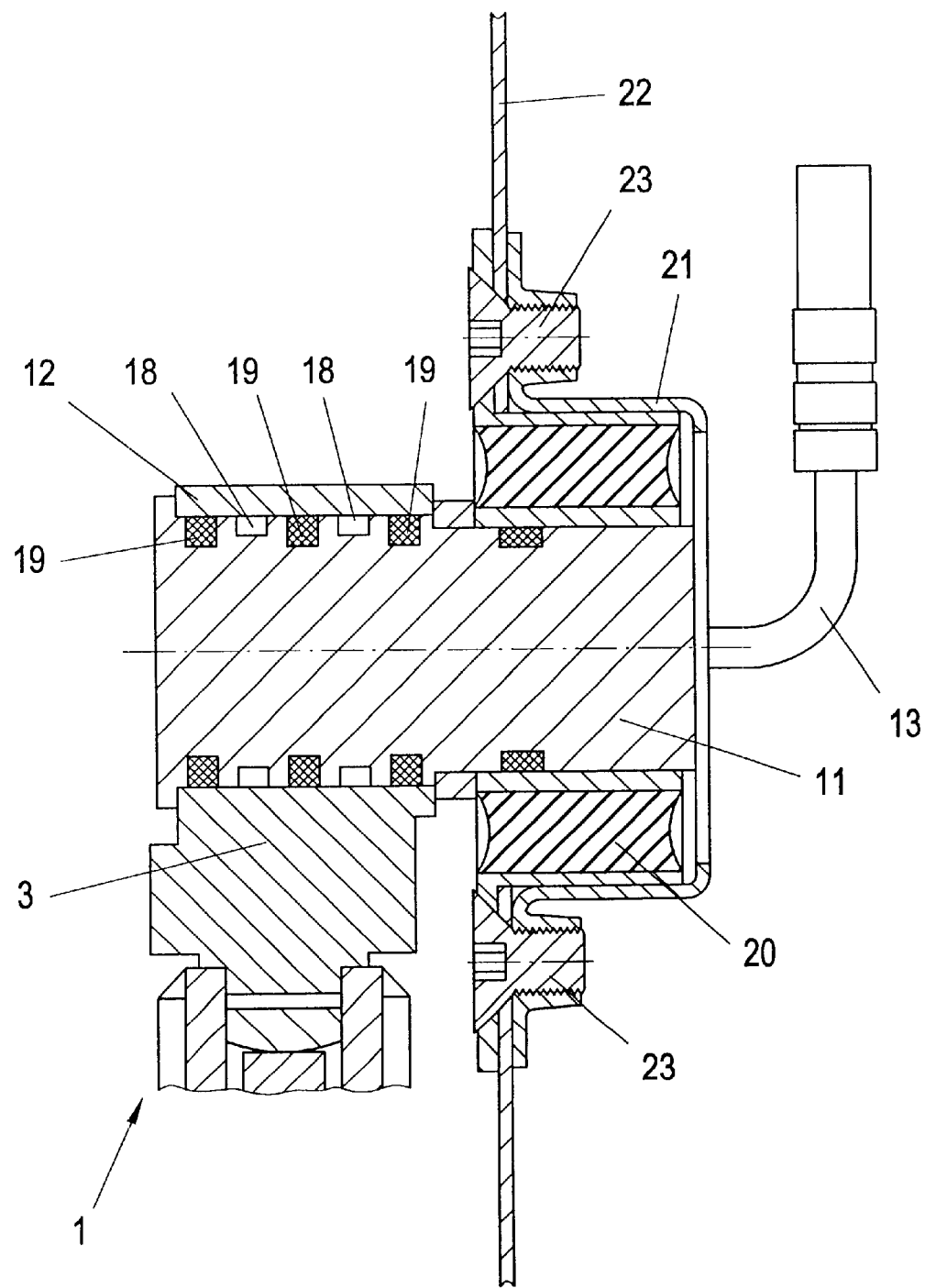
FIG. 2 shows a longitudinal sectional view in the region of the pivot pin of the inventive pivoting passage in an embodiment having an elastomer bearing.

In many cases of application, pivoting of the cylinder axis is not only proposed about the pivoting pin 11, but also about axes that lie at an angle thereto. The illustrated actuation arrangement, formed of a working cylinder 1 and a pneumatic spring 2, is thereby pivotably coupled to a pivot pin 11, which is held itself in a holding structure and which holding structure makes this additional pivoting possible. According to a first advantageous embodiment, which is illustrated in FIGS. 2 and 3, this holding structure is formed by an elastomer bearing 20. The pivot pin 11 is non-rotatably held in this elastomer bearing 20 whereby the bearing allows an at least limited movement of the actuation arrangement 1, 2 about any axis that is oriented at an angle to the axis of the pivot pin 11. The elastomer bearing 20 itself is also fixed rigidly in a bearing shell, which is attached on a part 22 of the vehicle by means of screws 23, for example.

Figure 4:
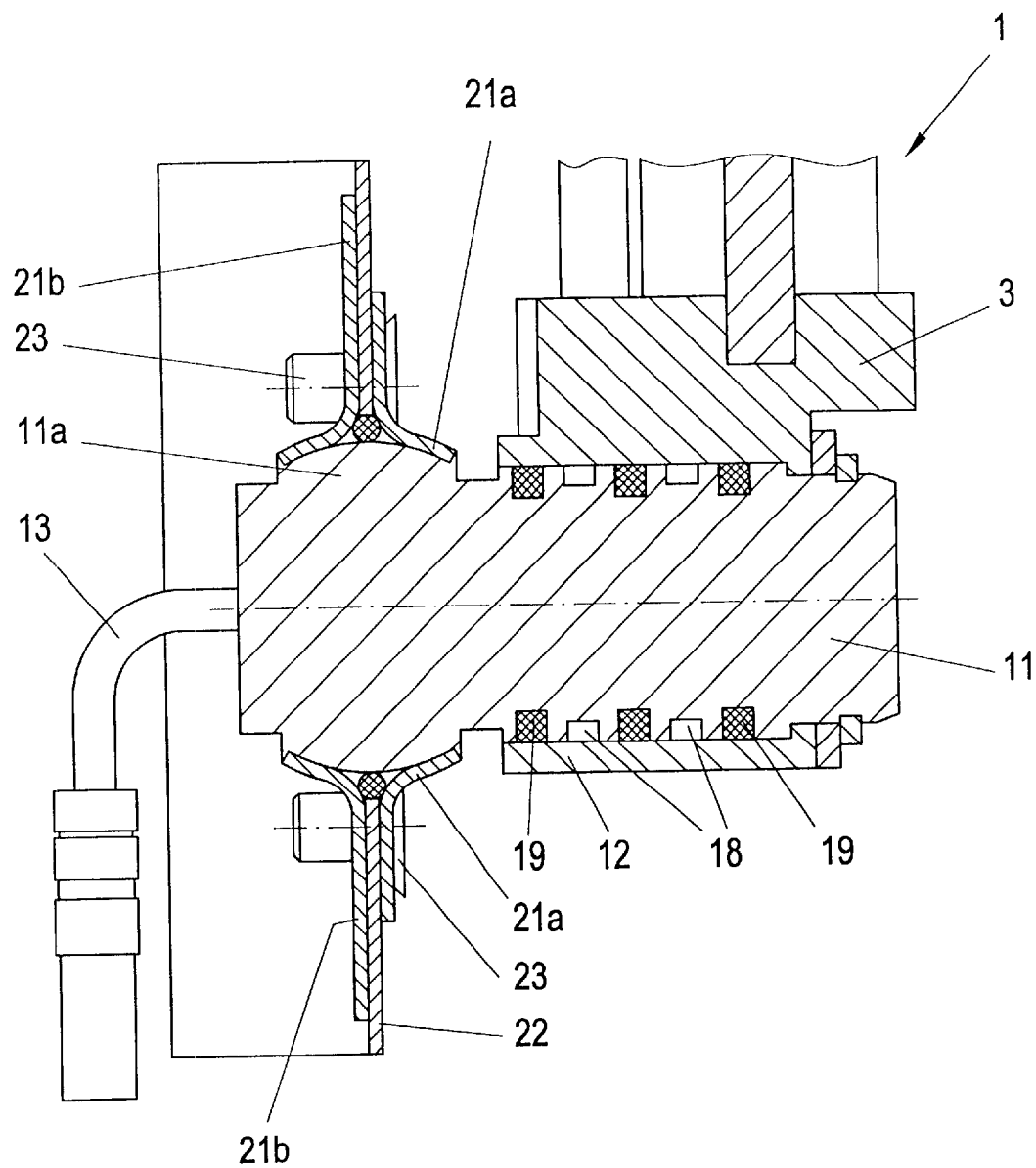
FIG. 4 shows a longitudinal sectional view of FIG. 2 in an additional embodiment having a spherical bearing.
Figure 5:
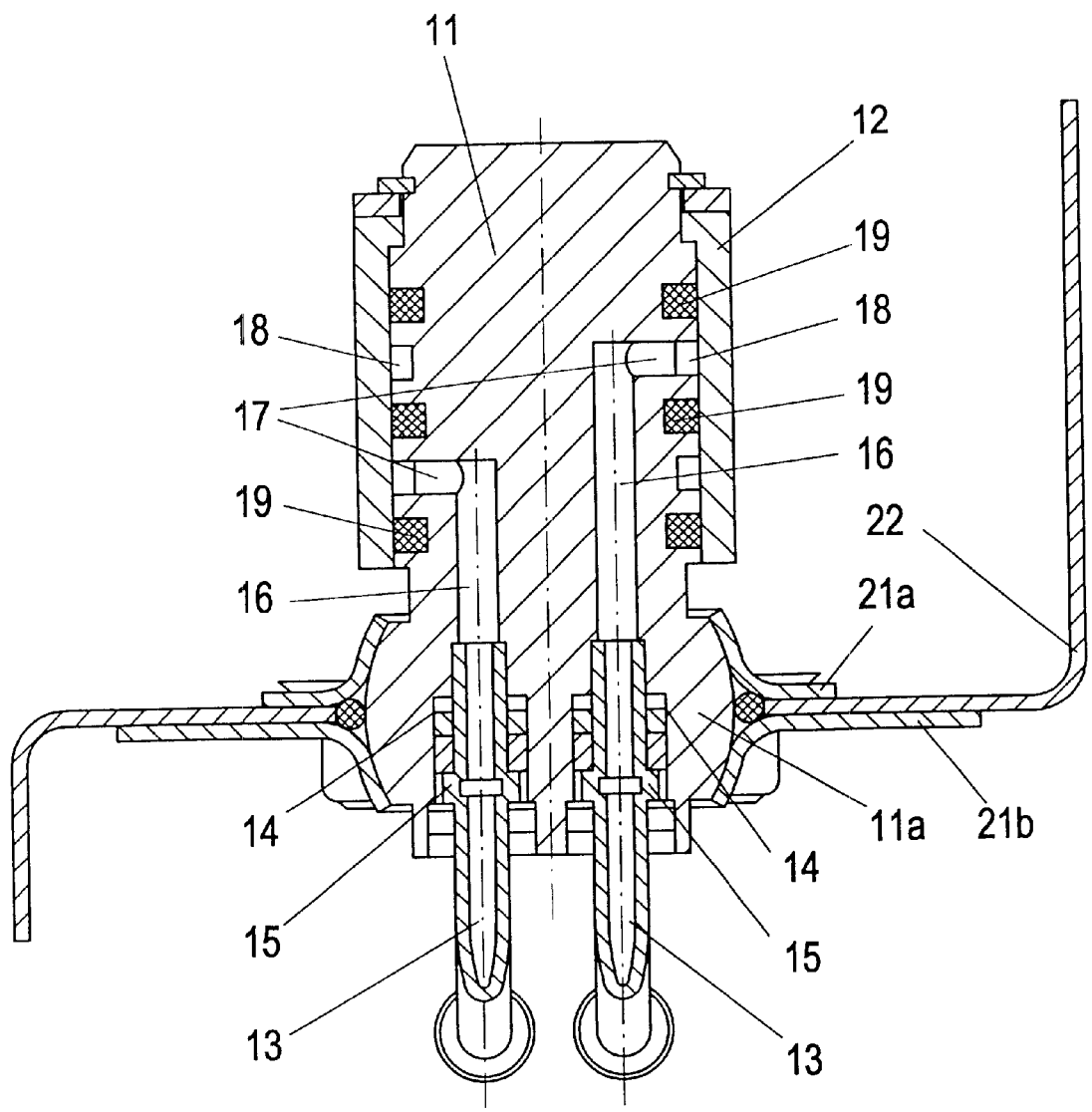
FIG. 5 shows a longitudinal sectional view in a plane turned 90° relative to FIG. 4.

According to a further embodiment of the invention, the actuation arrangement consisting of a working cylinder 1 and possibly an additional component 2 may be pivotably coupled to a pivot pin 11 which is held in place in a spherical bearing (shown in FIGS. 4 and 5). A holding structure 21,22 could therefore be provided with two shells 21a and 21b which face each other and which inner surfaces are part of a spherical surface. In the above-mentioned area between these bearing shells 21a and 21b there is a segment 11a of the pivot pin 11 received, which has at least one partially spherical surface, and whereby the surface of the segment 11a and the receiving area of the shells 21a and 21b are formed complementary relative to the holding structure. The shells 21a and 21b may be attached, for example by means of screws 23, to both sides of vehicle part 22 supporting the pivot pin 11.

Figure 6:
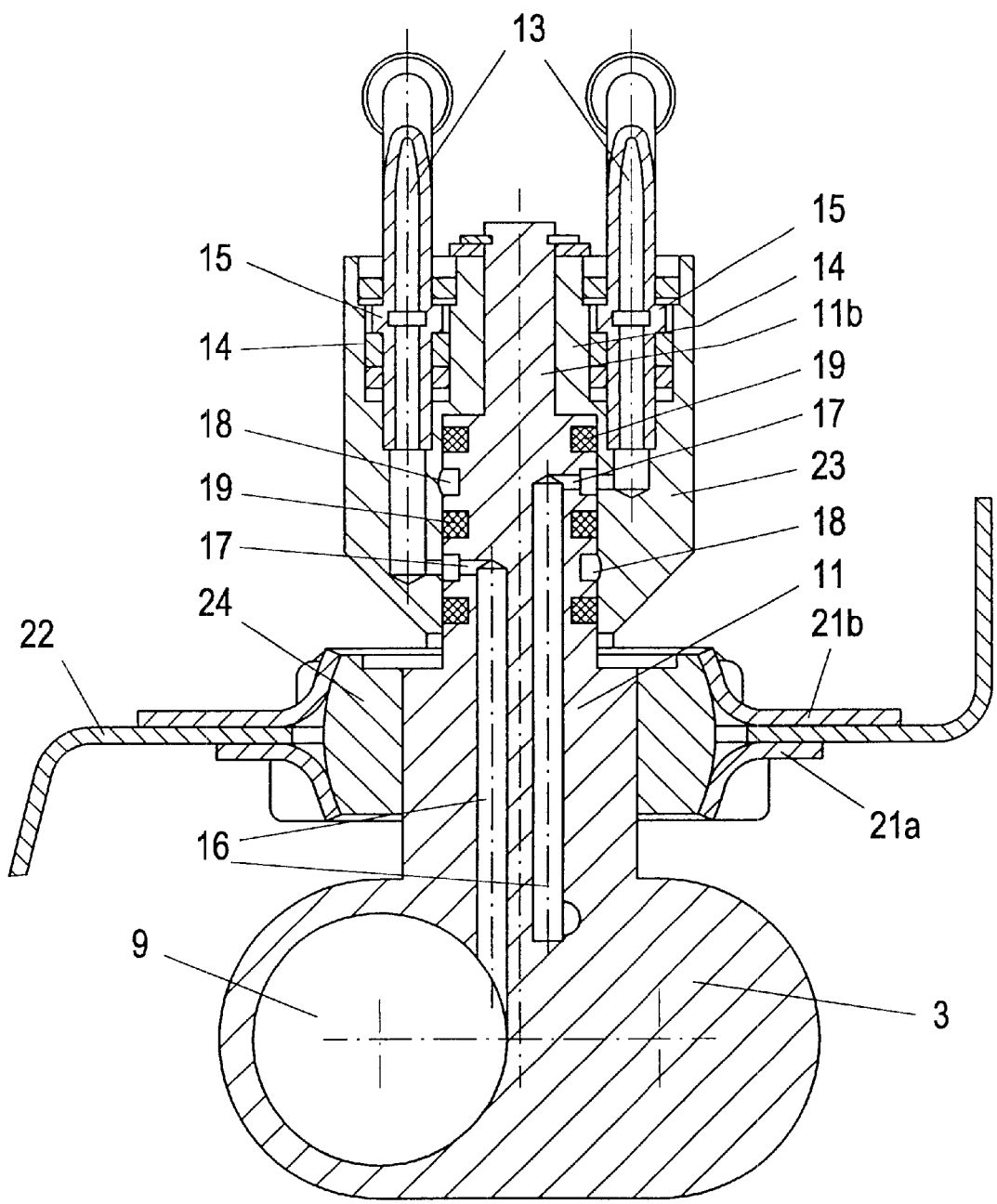
FIG. 6 shows a longitudinal sectional view through an additional embodiment having a spherical bearing in a plane according to FIG. 5.

FIG. 6 shows an additional embodiment wherein the mechanically, highly stressed section of the transition piece leading from the hydraulic cylinder to the pivot pin is designed in an especially strong fashion. The pivot pin 11 is here firmly connected to the bottom 3 of the hydraulic cylinder 1 and it is designed preferably as one piece therewith. The line connections 16, which run axially through the pivot pin 11, merge preferably directly into the bottom-side working chamber 9 or the passage to the opposite working chamber 6 of the working cylinder 1.

On the side of the pivot pin 11 that is opposite the working cylinder 1, the pivot pin 11 has an extension 11b that is designed for the advantageously detachable coupling of a pressure-medium connection casing 23. In this connection casing 23 there are in turn two connection recesses provided in an axial direction, which receive the ends of the two pressure medium lines 13. To make the pivot pin 11 pivotable relative to the essentially fixed pressure medium lines 13, there are grooves 18 and seals provided between the pressure-medium connection casing 23 and the extension 11b of the pivot pin 11 in the same manner and realizable in the same manner as described in the embodiments above in conjunction with FIG. 1 through FIG. 5.

Aside from the possible movable mounting of the pivot pin 11 in the vehicle holding structure via an elastomer bearing 20 or a pivot pin 11 with an at least partially spherical surface at one of its sections, which is also possible for the arrangement in FIG. 6, there is an additional possibility whereby a particular movement and angled position of the cylinder axis of the hydraulic cylinder may be realized about at least any one axis that is oriented at an angle to the axis of the pivot pin. The pivot pin 11 is thereby preferably pivotably mounted with its mid-section in a bearing casing 24 whereby the bearing casing 24 is provided with at least one partially spherical surface. This bearing casing 24 is in turn pivotably held between the bearing shells 21a and 21b at an axis that is at an angle to the axis of the pivot pin 11 whereby the bearing shells 21a and 21b may be connected to the vehicle part 22 that supports the pivot pin 11. Although the actuation arrangement is described in the above description for the embodiment with a typical application by having an double-action hydraulic cylinder 1, whereby at least two lines 13 are provided for the pressure medium, and therefore there are also two section 16 provided leading through the pivot pin 11 in an essentially axial direction; the innovative pivoting passage may also be used, in a general sense, for single-action cylinders having a corresponding single line 13 and one passage leading axially through the pivot pin 11 continuing into a working chamber 6 or 9. There are also several supply lines possible per working chamber or several axial conduits 16 or radial conduits 17 and/or grooves 18.

We claim:

1. An actuation arrangement for movable components on vehicles, comprising at least one hydraulic cylinder pivotably coupled to at least one of a cylindrical pivot pin on the vehicle and on the movable vehicle component, and having at least one line for the pressure medium in at least one working chamber of the hydraulic cylinder, wherein one section (16) of each pressure medium line (13) passes through the pivot pin (11) essentially in an axial direction and whereby at least one passage leads from said pivot pin (11) to at least one working chamber (8, 9) of the hydraulic cylinder (1).

2. An actuation arrangement according to claim 1, wherein one section (12) of the hydraulic cylinder (1) encompasses the pivot pin (11) at least partially, and wherein the section (16) of at least one line (13) that leads axially through said pivot pin (11) merges at one side of said hydraulic cylinder (1) into at least one essentially radial conduit (17), which in turn runs into at least one groove (18) that reaches across at least on part of a circumference of said pivot pin (11).

3. An actuation arrangement according to claim 1, wherein at least one hydraulic line (13) runs axially into said pivot pin (11).

4. An actuation arrangement according to claim 3, wherein at least one axial connection for a pressure-medium supply line (14) is provided in said pivot pin (11).

5. An actuation arrangement according to claim 1, wherein said pivot pin (11) is rigidly (non-rotatably) connected to said hydraulic cylinder (1) and the section (16) of at least one line (13) leading axially through said pivot pin (11) merges at the opposite side of said hydraulic cylinder (1) into at least one essentially radial conduit (17), which in turn runs into a groove (18) that encompasses at least a part of the circumference of said pivot pin (11), and whereby the side of the pivot pin that is provided with at least one groove may be connected to a pressure-medium connection sleeve 23.

6. An actuation arrangement according to claim 5, wherein at least one groove (18) reaches around the entire circumference of said pivot pin (11).

7. An actuation arrangement according to claim 5, wherein at least one groove (18) is formed in said pivot pin (11).

8. An actuation arrangement according to claim 5, wherein at least one groove (18) is formed by opposed recesses in said pivot pin (11) as well as in the section (12) of the hydraulic cylinder (1) that encompasses said pivot pin (11).

9. An actuation arrangement according to claim 5, wherein at least one groove (18) is formed in the section (12) of the hydraulic cylinder (1) that encompasses said pivot pin (11).

10. An actuation arrangement according to claim 1, wherein said pivot pin (11) is mounted and held in a holding structure (21, 21a, 21b, 22) which may be moved about at least an axis that is oriented at an angle to the axis of said pivot pin (11).

11. An actuation arrangement according to claim 10, wherein an elastomer bearing (20) is inserted between said pivot pin (11) and the holding structure (21, 22).

12. An actuation arrangement according to claim 10, wherein the part of the pivot pin (11) received in the holding structure (21a, 21b) is provided with an at least partially spherical surface and whereby the receiving area of said holding structure (21a, 21b) is formed in a complimentary manner thereto.

13. An actuation arrangement according to claim 12, wherein said pivot pin (11) is mounted in a bearing casing (24) having an at least partially spherical surface and wherein the receiving area of the holding structure (21a, 21b) is formed complimentary to the surface of the bearing casing.

14. An actuation arrangement according to claim 1, having a double-action cylinder, wherein at least two hydraulic lines (16) pass through said pivot pin (11) essentially in an axial direction and which merge into at least one essentially radial conduit (17), which in turn runs into at least one groove (18) per line that encompasses at least partially the circumference of the pivot pin.

15. An actuation arrangement according to claim 14, wherein the passage to the working chamber (6) of the hydraulic cylinder (1), which faces away from said pivot pin (11), leads through the inside of said hydraulic cylinder (1).

16. An actuation arrangement according to claim 15, wherein said hydraulic cylinder (1) is designed as a double-barrel cylinder whereby the passage to the working chamber (6) of the hydraulic cylinder, which faces away from the pivot pin (11), is formed by the annular space between the two barrels (7, 8) of said hydraulic cylinder (1).

17. An actuation arrangement according to claim 1, wherein at least one additional component is attached parallel to one or each hydraulic cylinder (1) whereby one end of the pneumatic spring is connected to the section (12) of the hydraulic cylinder (1) that encompasses the pivot pin, and the other end is coupled to the piston rod (4) of the hydraulic cylinder (1).

18. An actuation arrangement according to claim 17, wherein said additional component is pneumatic spring (2).

* * * * *